Oct. 11, 1932.  R. W. PAGE ET AL  1,881,906
TILE
Filed May 27, 1929
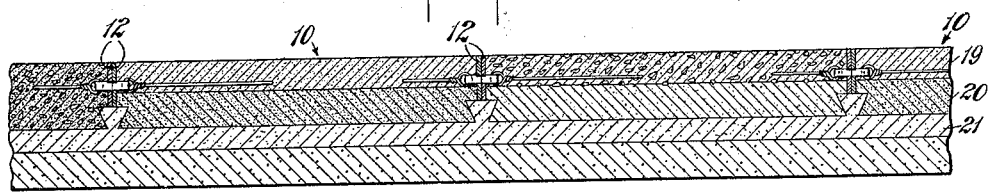
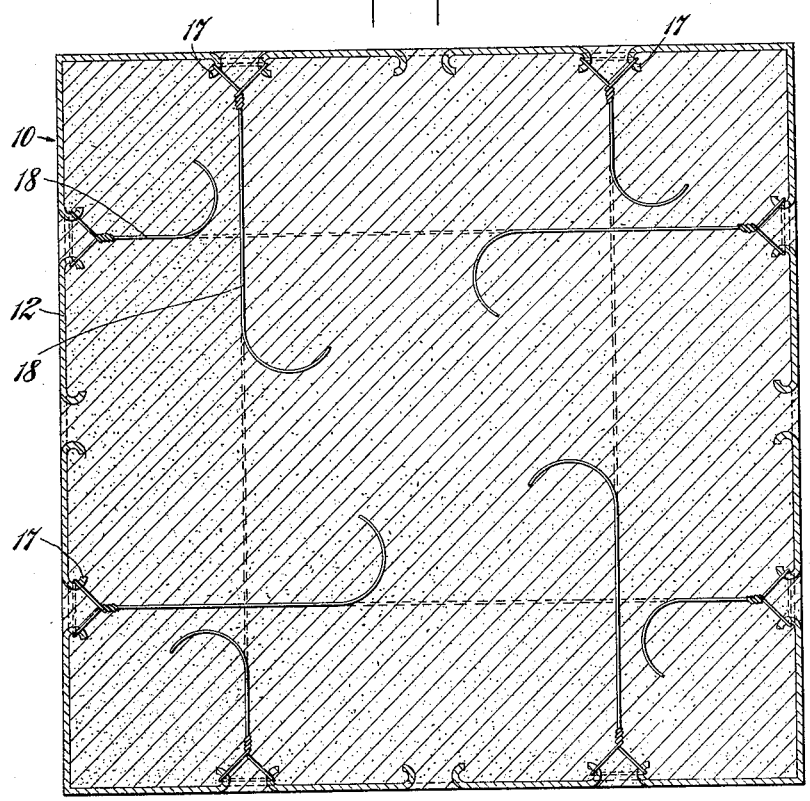
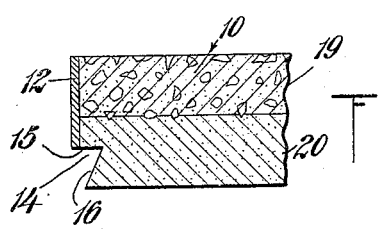
INVENTORS
Robert W. Page
and Frederic W. Hill
BY
ATTORNEY Patented Oct. 11, 1932

1,881,906

UNITED STATES PATENT OFFICE

ROBERT W. PAGE, OF GLEN RIDGE, AND FREDERIC W. HILL, OF SOUTH ORANGE, NEW JERSEY

TILE

Application filed May 27, 1929. Serial No. 366,298.

This invention relates to manufactured tiles for flooring, wainscoting, etc., and surface coverings made therefrom. The use of so-called terrazzo flooring and other cementitious flooring is limited by reason of the time required for laying, hardening and finishing. Terrazzo flooring has heretofore been made by laying on a suitable foundation a covering or layer of suitable thickness of a cementitious material consisting of an aggregate of small chips or pieces of marble or other stone mixed with suitable bonding material, such as Portland cement or magnesium oxy-chloride, or "magnesite," cement; the plastic mass being leveled off and allowed to harden and thereafter surface ground to obtain a smooth and finished surface in which the stone pieces are exposed. Such flooring is often laid in tile effect, with portions marked off by the exposed edges of brass strips set in the plastic mass. Other floor coverings of cementitious material are laid in the same way, requiring time for hardening, and then, if ground, further time for grinding and finishing the surface, during which time the floor is kept out of use. This required time makes it frequently inconvenient, and in some cases, quite impracticable, to lay flooring of this kind.

The present invention has been made more especially with the idea of reducing the time required for laying, and of avoiding other inconveniences and difficulties of laying, and objections to the use of, flooring of cementitious material, and especially terrazzo and other cementitious floorings which require surface grinding after becoming hardened. Such results are accomplished by the use of preformed tiles made according to the invention. Floorings and other surface coverings made from such tiles are laid much more conveniently and expeditiously than by the method of laying cementitious material in place in a plastic condition, and the coverings so made we believe to be equal in all respects to floor coverings molded in place, and in many respects superior thereto. They are free from liability to develop extended cracks such as occur in monolithic concrete and other cementitious flooring, they are easier to repair and to maintain the original appearance when repaired, and they have increased possibilities of producing more economically desirable ornamental designs and effects.

Tiles suitable for making such floorings and other surface coverings must be reasonably thin and yet strong; must match together perfectly and be securely held in place when set; must, although of more or less brittle material, stand handling without injury, and must have a suitable surface finish according to the kind of cementitious material used. Particular objects of the invention, then, are to provide a tile of cementitious material which, when laid on a bed coat while the latter is in plastic condition, will be firmly locked in place when the bed coat has hardened; to provide a tile of hardened cementitious material which may be handled without injury and which will fit in accurately with other similar tiles; and to provide such a tile having a finished and ornamental surface.

In order that the invention may clearly be understood, we will describe in detail improved embodiments of the invention, whereby these and other objects are attained. Such tiles are illustrated in the accompanying drawing, in which:—

Fig. 1 is a vertical section of part of a flooring formed of such tiles;

Fig. 2 is a sectional plan view of one of the tiles shown in Fig. 1; and

Fig. 3 is a broken transverse sectional view of part of one of the tiles on a larger scale.

Each tile, as illustrated, has a body 10 of hardened cementitious material, the upper, or face-side, portion of the edge of which is substantially perpendicular to the face of the tile and is surrounded by a thin frame 12 of suitable material, most desirably of non-corroding metal, such as brass. The lower, or inner, portion of the edge of the body below the frame 12 contains a re-entrant groove 14 extending all the way around. This groove most desirably has the form shown in the drawing, that is to say, it is formed with a horizontal surface 15 and an inclined surface 16. The perimeter of the back, or inner, surface of the body lies wholly inside the perimeter of the metal frame 12.

The frame 12 is formed most desirably of strips of thin metal, usually somewhat less than $\frac{1}{16}''$ thick, or of other suitable material, of a width somewhat greater than half the thickness of the tile, forming a continuous edging or binding strip completely enclosing the upper portion of the body 10, and the ends of the strips being most desirably soldered or otherwise joined together.

In making tiles having a ground face, the metal frame 12 is first placed in a mold of the proper form in which the frame 12 fits tightly against the sides of the mold, resting against a horizontally projecting shoulder which shapes the horizontal surface 15 of the tile. The cementitious material of which the tile is to be formed, having been brought to the desired consistency by the addition of water or other liquid, is then packed into the mold and the mass is leveled off to have a thickness sufficiently greater than the thickness of the completed tile to allow for subsequent grinding of the face surface. The material may be cast in the mold face surface up or face surface down, the mold being formed and the metal frame positioned therein accordingly.

The metal frame 12 is securely anchored to the body of the tile by means of suitable projections extending inward from the frame, most desirably by means of tongues 17 cut out of the frame and bent inwardly, as shown. The tiles are usually made not more than about 1'' in thickness and may be less, and it is sometimes desirable, especially in the case of relatively large tiles, to provide reinforcing strands or rods secured to the frame and embedded in the body 10, as by providing separate wires or other strands 18 secured to the tongues 17 and extending inwardly in the body 10. In some cases it may be desirable to have rods or strands extend across the tile from side to side as indicated by dotted lines in Fig. 2 instead of disconnected separate strands as shown by full lines.

After the tile thus formed in the mold has reached its "final set" and is sufficiently hard, it is removed from the mold, and then after it has further hardened, and most desirably, after it has aged for several days, the face surface of the tile, including the edge of the metal frame 12, is ground to reduce the tile to the desired standard thickness and finished to a smooth plane surface. The final operation may be such as to give the tile a fine polished surface.

It may be desirable with some materials, instead of grinding the face of the tile after the cementitious material has hardened, to trowel or otherwise smooth off the face in a suitable manner while the molded mass is still in the mold and in a more or less plastic condition.

The tile may be made of any suitable cementitious material, that is, a material which is in suitable plastic condition when cast and later sets to a hard mass. Usually the material will be "magnesite" or Portland cement with a suitable filler, which may be powdered, or fine—or coarse—granular material, or fibrous material. For making terrazzo flooring or wall covering, the cement or cementitious material will have mixed with it the usual small chips or pieces of marble or other stone mixed with the cementitious material in suitable proportions. By the surface grinding of the tile, these stone pieces are exposed, embedded in the tile surface as in terrazzo flooring laid in the customary manner.

The body 10 of the tile may be of the same composition throughout. It is usually desirable, however, to make the body of two layers 19 and 20 of cementitious material having different compositions. This may be for the purpose of economy, the under layer being of material cheaper than the upper layer, as in the tile to the right of the center in Fig. 1, which are shown as having an upper layer of terrazzo concrete and an under layer of cheaper material. The more important reason, however, for making the tile body of two layers is to avoid warping when the face of the tile is made of a composition liable to warp. A relatively thin tile of "magnesite" cement with a fine grain filler has a strong tendency to warp. When the face of the tile is to be of such material, therefore, we make the tile with an under, or inner, layer of cementitious material made with magnesite cement or other cement, but containing a filler of relatively large granules of strong, rigid material, such as coarse sand, which does not tend to warp, and which, being bonded to the upper layer, serves to hold the upper layer from warping. Such a tile is shown to the left of the center of Fig. 1 and at the extreme right. The under layer should be of sufficient thickness to extend somewhat above the lower edge of the binding strip or metal frame 12, and in order that the two layers shall be strongly joined or bonded together, the last molded layer is best, though not necessarily, laid or packed into the mold before the first layer has become set or hardened. The piece of tile at the extreme left of Fig. 1 is shown as of the same composition throughout.

To form a floor of tiles such as have been described, the tiles are laid in a bed coat 21 of suitable cementitious material while the bed coat is still in a suitable plastic condition. The tiles are laid together edge to edge on the bed coat, care being taken that the bed coat material fills the bottom edge grooves so that when the tiles are pressed down with their outer faces leveled in a common plane and with the surfaces of the frames 12 of contiguous tiles fitting tightly together, the bed coat is forced into the channels provided by the re-entrant grooves 14, where it hardens in ridges of keystone shape which firmly lock the tiles to the bed coat and securely hold them against either vertical or horizontal movement.

Specific advantages gained by the use of the metal frame 12 are that it protects the upper portion of the edge and the upper corners of the tile from becoming chipped in handling, insures a perfect fit of the tiles when they are laid, and provides an expansion joint at the juncture of the tiles. Also, the edges of the strips showing at the surface form a part of the finished floor design.

The use of terrazzo and other surface coverings of cementitious material laid in place in a plastic condition and thereafter surface ground according to the old methods, is practically limited to floors and other horizontal top surfaces. An important advantage of the present invention is that it provides means for applying economically such surface coverings to walls and other vertical surfaces.

For convenience in description, the words "upper" and "lower" and "under" have been applied to the tile in the position which it takes when laid on a floor. Such use of these words in the claims is to be understood as not in any way limiting the use of the tile or the position in which it is laid.

What is claimed is:

1. A tile consisting of a body of hardened cementitious material, and a thin protecting frame surrounding the edge of the upper part of the body to provide it with a smooth vertical edge surface to fit against the corresponding upper portions of the edges of adjacent tiles, the lower portion of the body having an exposed edge lying within the perimeter of the frame to bond with a bed coat in which the tile is laid.

2. A tile consisting of a body of hardened cementitious material, and a thin protecting frame surrounding the edge of the upper part of the body to provide it with a smooth vertical edge surface to fit against the corresponding upper portions of the edges of adjacent tiles, the lower portion of the body having an exposed edge lying within the perimeter of the frame and containing a re-entrant groove extending around the tile for locking the tile to a bed coat in which the tile is laid.

3. A tile consisting of a body of hardened cementitious material, and a thin metal frame surrounding the edge of the upper part of the body to provide it with a smooth vertical edge surface to fit against the corresponding upper portions of the edges of adjacent tiles, the lower portion of the body having an exposed edge lying within the perimeter of the frame and extending horizontally inward from the lower edge of the frame and then outwardly and downwardly to the bottom face of the tile.

4. A tile, consisting of a body of hardened cementitious material, a thin metal frame surrounding the edge of the upper part of the body to provide it with a smooth vertical edge surface to fit against the corresponding upper portions of the edges of adjacent tiles, and reinforcing members connected to the frame and embedded in the body, the lower portion of the body having an exposed edge lying within the perimeter of the frame and containing a re-entrant groove extending around the tile for locking the tile with a bed coat in which the tile is laid.

5. A tile having a body consisting of two layers of cementitious material of different compositions, and a thin metal frame surrounding the edge of the upper part of the body to provide it with a smooth vertical edge surface to fit against the corresponding upper portions of the edges of adjacent tiles, said frame covering the edge of the upper layer and an upper portion of the edge of the under layer, and having its upper edge flush with the face of the tile and being locked to the tile body by inward projections embedded in the body, the bottom edge of the under layer lying within the perimeter of the frame and the portion of the edge surface of the under layer below the frame containing a re-entrant groove extending around the tile for locking the tile to a bed coat.

6. A tile having a body consisting of an upper layer of cementitious material liable to warp and a strengthening under layer of non-warping cementitious material integrally united to the upper layer, and a thin edge frame covering the edge of the upper layer and the upper part of the edge of the under layer.

7. A surface covering formed of tiles of cementitious material laid on a continuous bed coat of cementitious material, each tile having a lower face whose perimeter lies wholly inside the perimeter of its upper face and having the upper portion of its edge perpendicular to its upper face and the lower portion of its edge formed with a re-entrant groove extending around the tile, and the tiles being laid on the bed coat with the upper portion of the edge of each tile fitted against the upper portion of the edge of adjacent tiles and with material of the bed coat extending between the lower portions of the tiles and into the re-entrant grooves to lock the tiles to the bed coat.

In testimony whereof, we have hereunto set our hands.

ROBERT W. PAGE.
FREDERIC W. HILL.